(12) United States Patent
Nishimura et al.

(10) Patent No.: US 11,662,731 B2
(45) Date of Patent: May 30, 2023

(54) SYSTEMS AND METHODS FOR CONTROLLING A ROBOT

(71) Applicants: Toyota Research Institute, Inc., Los Altos, CA (US); The Board of Trustees of the Leland Stanford Junior University, Stanford, CA (US)

(72) Inventors: Haruki Nishimura, Stanford, CA (US); Negar Zahedi Mehr, Champaign, IL (US); Adrien David Gaidon, Mountain View, CA (US); Mac Schwager, Stanford, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 262 days.

(21) Appl. No.: 17/174,789

(22) Filed: Feb. 12, 2021

(65) Prior Publication Data
US 2022/0080585 A1 Mar. 17, 2022

Related U.S. Application Data

(60) Provisional application No. 63/077,971, filed on Sep. 14, 2020.

(51) Int. Cl.
*G05D 1/02* (2020.01)
*B25J 9/16* (2006.01)

(52) U.S. Cl.
CPC ......... *G05D 1/0214* (2013.01); *G05D 1/0287* (2013.01); *B25J 9/163* (2013.01)

(58) Field of Classification Search
CPC ..... G05D 1/0214; G05D 1/0287; B25J 9/163; B25J 9/1666
See application file for complete search history.

(56) References Cited

U.S. PATENT DOCUMENTS

2022/0032960 A1* 2/2022 Wang ................ H04W 4/40
2022/0204030 A1* 6/2022 Nishimura ...... B60W 60/00274

OTHER PUBLICATIONS

Broadhurst, A., et al., "Monte Carlo Road Safety Reasoning.", 2005, IEEE, Intelligent Vehicles Symposium, pp. 319-324 (Year: 2005).*

(Continued)

*Primary Examiner* — Ian Jen
*Assistant Examiner* — Karston G. Evans
(74) *Attorney, Agent, or Firm* — Christopher G. Darrow; Darrow Mustafa PC (57) ABSTRACT

Systems and methods described herein relate to controlling a robot. One embodiment receives an initial state of the robot, an initial nominal control trajectory of the robot, and a Kullback-Leibler (KL) divergence bound between a modeled probability distribution for a stochastic disturbance and an unknown actual probability distribution for the stochastic disturbance; solves a bilevel optimization problem subject to the modeled probability distribution and the KL divergence bound using an iterative Linear-Exponential-Quadratic-Gaussian (iLEQG) algorithm and a cross-entropy process, the iLEQG algorithm outputting an updated nominal control trajectory, the cross-entropy process outputting a risk-sensitivity parameter; and controls operation of the robot based, at least in part, on the updated nominal control trajectory and the risk-sensitivity parameter.

20 Claims, 4 Drawing Sheets

(56) References Cited

OTHER PUBLICATIONS

Chen, J., et al., "Constrained Iterative LQR for On-Road Autonomous Driving Motion Planning", 2017, IEEE, 20th International Conference on Intelligent Transportation Systems, pp. 1-7 (Year: 2017).*

Yin, H., et al., "Learning Cost Function and Trajectory for Robotic Writing Motion", 2014, IEEE, 14th IEEE—RAS International Conference on Humanoid Robots (Humanoids), pp. 608-615 (Year: 2014).*

Pan, Y., et al., "Safe Planning for Self-Driving Via Adaptive Constrained ILQR", Mar. 2020, arXiv (Year: 2020).*

Bechtle et al., "Curious iLQR: Resolving Uncertainty in Model-based RL", Proceedings of the Conference on Robot Learning, PMLR 100:162-171, 2020.

Nishimura et al., "Risk-Sensitive Sequential Action Control with Multi-Modal Human Trajectory Forecasting for Safe Crowd-Robot Interaction", found at: arXiv:2009.05702v1 [cs.RO] Sep. 12, 2020.

Van Parys et al., "Distributionally robust control of constrained stochastic systems," IEEE Transactions on Automatic Control, vol. 61, No. 2, pp. 430-442, 2016.

Sinha et al., "Formulazero: Distributionally robust online adaptation via offline population synthesis", Proceedings of the 37th International Conference on Machine Learning, PMLR 119:8992-9004, 2020.

Hakobyan et al., "Wasserstein distributionally robust motion planning and control with safety constraints using conditional value-at-risk," in 2020 IEEE International Conference on Robotics and Automation (ICRA), 2020, pp. 490-496.

Exarchos et al., "Game-theoretic and risk-sensitive stochastic optimal control via forward and backward stochastic differential equations," in 2016 IEEE 55th Conference on Decision and Control (CDC). IEEE, 2016, pp. 6154-6160.

Doyle, "Guaranteed margins for lqg regulators," IEEE Transactions on automatic Control, vol. 23, No. 4, pp. 756-757, 1978.

Kusumoto et al., "Informed information theoretic model predictive control," in 2019 international Conference on Robotics and Automation (ICRA). IEEE, 019, pp. 2047-2053.

Schmerling et al., "Multimodal probabilistic model-based planning for human-robot interaction,", found at: arXiv:1710.09483v1 [cs.RO] Oct. 25, 2017.

Ivanovic et al., "Mats: An interpretable trajectory forecasting representation for planning and control," found at: arXiv:2009.07517v1 [cs.RO] Sep. 16, 2020.

Chai et al., "Multipath: Multiple probabilistic anchor trajectory hypotheses for behavior prediction," in ~Conference on Robot Learning, 2019, pp. 86-99.

Wang et al., "Fast risk assessment for autonomous vehicles using learned models of agent futures," found at: arXiv:2005.13458v2 [cs.RO] Jun. 3, 2020.

Salzmann et al., "Trajectron++: Dynamically-feasible trajectory forecasting with heterogeneous data," in European Conference Computer Vision, Aug. 2020.

Belghazi et al., "Mine: mutual information neural estimation," found at: arXiv:1801.04062v1 [cs.LG] Jan. 12, 2018.

Iranzad, "Estimation of information measures and its applications in machine learning," Ph.D. dissertation, University of Michigan, 2019.

Chua et al., "Deep reinforcement learning in a handful of trials using probabilistic dynamics models," found at: arXiv:1805.12114v2 [cs.LG] Nov. 2, 2018.

Petersen, et al., "Minimax Optimal Control of Stochastic Uncertain Systems with Relative Entropy Constraints," IEEE Transactions on Automatic Control, vol. 45, No. 3, pp. 398-412, 2000.

Todorov, et al., "A Generalized Iterative LQG Method for Locally Optimal Feedback Control of Constrained Nonlinear Stochastic Systems," in Proceedings of the 2005, American Control Conference, 2005. IEEE, 2005, pp. 300-306.

Tassa, et al., "Synthesis and Stabilization of Complex Behaviors Through Online Trajectory Optimization," in 2012 IEEE/RSJ International Conference on Intelligent Robots and Systems. IEEE, 2012, pp. 4906-4913.

Wang, et al., "Game-theoretic Planning for Risk-aware Interactive Agents," in 2020 IEEE/RSJ International Conference on Intelligent Robots and Systems. IEEE, Under Review.

Majumdar, et al., "How Should a Robot Assess Risk? Towards an Axiomatic Theory of Risk in Robotics," in Robotics Research. Springer, 2020, pp. 75-84. found at: arXiv:1710.11040v2 [cs.RO] Nov. 1, 2017.

Whittle, et al., "Risk Sensitivity, a Strangely Pervasive Concept," Macroeconomic Dynamics, vol. 6, No. 1, pp. 5-18, 2002.

Williams et al., "Best Response Model Predictive Control for Agile Interactions Between Autonomous Ground Vehicles," 2018 IEEE International Conference on Robotics and Automation (ICRA) May 21-25, 2018, Brisbane, Australia.

Farshidian, et al., "Risk Sensitive, Nonlinear Optimal Control: Iterative Linear Exponential-quadratic Optimal Control with Gaussian Noise," arXiv preprint arXiv:1512.07173, 2015. arXiv:1512.07173v1 [cs.SY] Dec. 22, 2015.

Roulet, et al., "On the Convergence of the Iterative Linear Exponential Quadratic Gaussian Algorithm to Stationary Points," found at: arXiv:1910.08221v1 [math.OC] Oct. 18, 2019.

Roulet, et al., "On the Convergence to Stationary Points of the Iterative Linear Exponential Quadratic Gaussian Algorithm,", pp. 1-27. Oct. 1, 2019.

Medina, et al., "Disagreement-aware physical assistance through risk-sensitive optimal feedback control," in 2012 IEEE/RSJ International Conference on Intelligent Robots and Systems. IEEE, 2012, pp. 3639-3645.

Skaf, et al., "Design of Affine Controllers Via Convex Optimization," IEEE Transactions on Automatic Control, vol. 55, No. 11, pp. 2476-2487, 2010.

Luo, et al., "Multi-robot Collision Avoidance Under Uncertainty with Probabilistic Safety Barrier Certificates," arXiv preprint arXiv:1912.09957, arXiv:1912.09957v3 [cs.RO] Dec. 7, 2020.

Tomlin, et al., "Conflict Resolution for Air Traffic Management: A Study in Multiagent Hybrid Systems," IEEE Transactions on automatic control, vol. 43, No. 4, pp. 509-521, 1998.

Chen, et al., "Multi-vehicle Collision Avoidance Via Hamilton-Jacobi Reachability and Mixed Integer Programming," found at: arXiv:1603.05200v2 [cs.SY] Oct. 4, 2016.

Blackmore, et al., "Chance-constrained Optimal Path Planning with Obstacles," IEEE Transactions on Robotics, vol. 27, No. 6, pp. 1080-1094, 2011.

Basar, "Performance-Driven Robust Identification and Control of Uncertain Dynamical Systems," Decision and Control Laboratory and Coordinated Science Laboratory, University of Illinois at Urbana-Champaign, Oct. 29, 2001.

Medina, et. al., "Risk-sensitive Optimal Feedback Control for Haptic Assistance," in 2012 IEEE international conference on robotics and automation. IEEE, 2012, pp. 1025-1031.

Chow, et al., "Risk-sensitive and Robust Decision-making: A CVaR Optimization Approach," in Advances in Neural Information Processing Systems, 2015, pp. 1522-1530. arXiv:1506.02188v1 [cs.AI] Jun. 6, 2015.

Samuelson, et al., "Safety-aware Optimal Control of Stochastic Systems Using Conditional Value-at-risk," found at: arXiv:1802.07903v1 [math.OC] Feb. 22, 2018.

Bertsekas, et al., "Dynamic Programming and Optimal Control". Athena Scientific Belmont, MA, 1995, vol. 1, No. 2.

Roulet, et al., "Iterative Linearized Control from an Optimization Viewpoint" INFORMS Annual Meeting 2019 University of Washington, pp. 1-14.

Charalambos, "Partially Observable Nonlinear Risk-Sensitive Control Problems: Dynamic Programming and Verification Theorems" pp. 1-15, 1997, found at https://pdfs.semanticscholar.org/2ba7/698fd6f3271d0db358e69f81be6b82eb3464.pdf.

Li, et al., "Iterative Linear Quadratic Regulator Design for Nonlinear Biological Movement Systems." in ICINCO (1), 2004, pp. 222-229.

(56) References Cited

OTHER PUBLICATIONS

Van Den Berg, et al., "Motion Planning Under Uncertainty Using Iterative Local Optimization in Belief Space," The International Journal of Robotics Research, vol. 31, No. 11, pp. 1263-1278, 2012.

* cited by examiner

SYSTEMS AND METHODS FOR CONTROLLING A ROBOT

CROSS-REFERENCE TO RELATED APPLICATION

This application claims the benefit of U.S. Provisional Patent Application No. 63/077,971, "DR-ILEQG: Distributionally-Robust Optimal Control of Nonlinear Dynamical Systems for Safety-Critical Applications," filed Sep. 14, 2020, which is incorporated by reference herein in its entirety.

STATEMENT REGARDING FEDERALLY SPONSORED RESEARCH OR DEVELOPMENT

This invention was made with government support under contract N00014-18-1-2830 awarded by the Office of Naval Research (ONR). The government has certain rights in the invention.

TECHNICAL FIELD

The subject matter described herein relates in general to robots and, more specifically, to systems and methods for controlling a robot.

BACKGROUND

Proper modeling of a robot (one example of a stochastic system) is an important aspect of successful control and decision making under uncertainty due to probabilistically-described disturbances (e.g., noise). In particular, accurate characterization of the underlying probability distribution associated with those disturbances is important, since it encodes how the system is expected to behave unexpectedly over time. However, such a modeling process can pose significant challenges in real-world problems. On the one hand, only limited knowledge of the underlying system may be available, resulting in the use of an erroneous model (the "model-mismatch" problem). On the other hand, even if a complicated stochastic phenomenon, such as a complex multi-modal distribution, can be perfectly modeled, it may still not be appropriate for the sake of real-time control or planning. Indeed, many model-based stochastic control methods require a Gaussian noise assumption, and many of the other methods require computationally intensive sampling.

SUMMARY

An example of a system for controlling a robot is presented herein. The system comprises one or more processors and a memory communicably coupled to the one or more processors. The memory stores an input module including instructions that when executed by the one or more processors cause the one or more processors to receive an initial state of the robot, an initial nominal control trajectory of the robot, and a Kullback-Leibler (KL) divergence bound between a modeled probability distribution for a stochastic disturbance and an unknown actual probability distribution for the stochastic disturbance. The memory also stores a computation module including instructions that when executed by the one or more processors cause the one or more processors to solve a bilevel optimization problem subject to the modeled probability distribution and the KL divergence bound using an iterative Linear-Exponential-Quadratic-Gaussian (iLEQG) algorithm and a cross-entropy process, the iLEQG algorithm outputting an updated nominal control trajectory, the cross-entropy process outputting a risk-sensitivity parameter. The memory also stores a control module including instructions that when executed by the one or more processors cause the one or more processors to control operation of the robot based, at least in part, on the updated nominal control trajectory and the risk-sensitivity parameter.

Another embodiment is a non-transitory computer-readable medium for controlling a robot and storing instructions that when executed by one or more processors cause the one or more processors to receive an initial state of the robot, an initial nominal control trajectory of the robot, and a Kullback-Leibler (KL) divergence bound between a modeled probability distribution for a stochastic disturbance and an unknown actual probability distribution for the stochastic disturbance. The instructions also cause the one or more processors to solve a bilevel optimization problem subject to the modeled probability distribution and the KL divergence bound using an iterative Linear-Exponential-Quadratic-Gaussian (iLEQG) algorithm and a cross-entropy process, the iLEQG algorithm outputting an updated nominal control trajectory, the cross-entropy process outputting a risk-sensitivity parameter. The instructions also cause the one or more processors to control operation of the robot based, at least in part, on the updated nominal control trajectory and the risk-sensitivity parameter.

Another embodiment is a method of controlling a robot, the method comprising receiving an initial state of the robot, an initial nominal control trajectory of the robot, and a Kullback-Leibler (KL) divergence bound between a modeled probability distribution for a stochastic disturbance and an unknown actual probability distribution for the stochastic disturbance. The method also includes solving a bilevel optimization problem subject to the modeled probability distribution and the KL divergence bound using an iterative Linear-Exponential-Quadratic-Gaussian (iLEQG) algorithm and a cross-entropy process, the iLEQG algorithm outputting an updated nominal control trajectory, the cross-entropy process outputting a risk-sensitivity parameter. The method also includes controlling operation of the robot based, at least in part, on the updated nominal control trajectory and the risk-sensitivity parameter.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

In various embodiments disclosed herein, systems and methods for controlling a robot address the problem of model mismatch via distributionally robust control, wherein a potential distributional mismatch is considered between a baseline Gaussian process noise and the true, unknown model within a certain Kullback-Leibler (KL) divergence bound. The use of the Gaussian distribution is advantageous to retain computational tractability without the need for sampling in the state space. Some embodiments include a model predictive control (MPC) method for nonlinear, non-Gaussian systems with non-convex costs. In some embodiments, the robot is an autonomous vehicle, and the techniques disclosed herein can be used, for example, to safely navigate the autonomous vehicle among human pedestrians where the stochastic transition model for the human pedestrians is imperfect.

The various embodiments described herein make use of the equivalence between distributionally robust control and risk-sensitive optimal control. Unlike the conventional stochastic optimal control that is concerned with the expected cost, risk-sensitive optimal control seeks to optimize the following entropic risk measure:

$$R_{p,\theta}(J) \triangleq \frac{1}{\theta} \log \mathbb{E}_p[\exp(\theta J)],$$

where p is a probability distribution characterizing any source of randomness in the system, $\theta > 0$ is a user-defined scalar parameter called the risk-sensitivity parameter, and J is an optimal control cost. The risk-sensitivity parameter $\theta$ determines a relative weight between the expected cost and other higher-order moments such as the variance. Loosely speaking, the larger $\theta$ becomes, the more the objective cares about the variance and the more risk-sensitive it becomes.

The distributionally robust control algorithms employed by various embodiments disclosed herein can alternatively be viewed as algorithms for automatic online tuning of the risk-sensitivity parameter in applying risk-sensitive control. Risk-sensitive optimal control has been shown to be effective and successful in many robotics applications. However, conventional approaches require the user to specify a fixed risk-sensitivity parameter offline. This requires an extensive trial and error process until a desired robot behavior is observed. Furthermore, a risk-sensitivity parameter that works in a certain state can be infeasible in another state. Ideally, the risk-sensitivity should be adapted online depending on the situation to obtain a specifically desired robot behavior, yet this is nontrivial because no simple general relationship is known between the risk-sensitivity parameter and the performance of the robot. The embodiments discussed herein address that challenge. Due to the fundamental equivalence between distributionally robust control and risk-sensitive control, those embodiments provide nonlinear risk-sensitive control that can dynamically adjust the risk-sensitivity parameter depending on the state of the robot as well as the surrounding environment.

In some embodiments, a system for controlling a robot receives an initial state of the robot, an initial nominal control trajectory of the robot, and a KL divergence bound between the modeled probability distribution for a stochastic disturbance and the unknown actual probability distribution for the stochastic disturbance. The system solves a bilevel optimization problem subject to the modeled probability distribution and the KL divergence bound using an iterative Linear-Exponential-Quadratic-Gaussian (iLEQG) algorithm and a cross-entropy process. The iLEQG algorithm outputs, among other things, an updated nominal control trajectory, and the cross-entropy process outputs a risk-sensitivity parameter. In U.S. Provisional Patent Application No. 63/077,971, the algorithm for solving the bilevel optimization problem was called the Distributionally Robust iLEQG (DR-ILEQG) algorithm. Herein, this algorithm is sometimes referred to as the Risk Auto-Tuning iterative Linear-Quadratic Regulator (RAT iLQR) algorithm.

The various embodiments described herein perform the bilevel optimization based on the worst-case distribution within a set of possible distributions that also includes the distribution used in the stochastic-system model. Such a set of distributions can be analyzed using a metric such as the KL divergence bound. Importantly, the system does not have to know, a priori, what that worst-case distribution is.

The remainder of this Detailed Description is organized as follows. First, an overview of a robot 100 and an associated robot control system 120 is provided in connection with FIGS. 1 and 2. A more detailed explanation of the RAT iLQR algorithm employed by robot control system 120, including the underlying mathematical concepts, is then presented. That explanation includes reference to FIGS. 3A and 3B. This explanation is then followed by a discussion of the method flowchart of FIG. 4.

Figure 1:
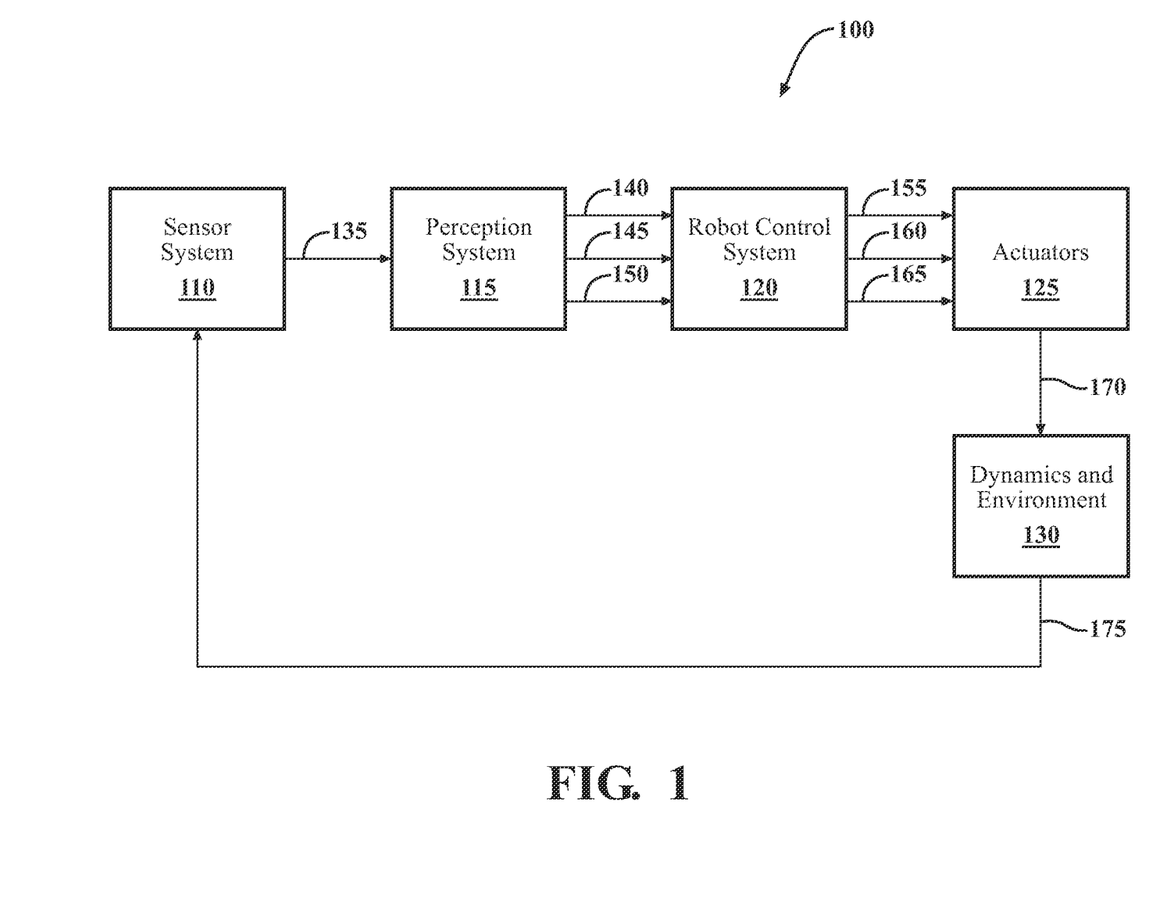
FIG. 1 illustrates a robot, in accordance with an illustrative embodiment of the invention.

Referring to FIG. 1, an example of a robot 100 is illustrated. Some examples of a robot 100 include, without limitation, an autonomous or semi-autonomous vehicle (e.g., an autonomous or semi-autonomous automobile), an autonomous aerial drone (e.g., a quadrotor), a security robot, a customer-service robot, and a delivery robot. The robot 100 also includes various elements. It will be understood that in various embodiments it may not be necessary for the robot 100 to have all of the elements shown in FIG. 1. The robot 100 can have any combination of the various elements shown in FIG. 1. Further, the robot 100 can have additional elements to those shown in FIG. 1. In some arrangements, the robot 100 may be implemented without one or more of the elements shown in FIG. 1.

Some of the possible elements of the robot 100 are shown in FIG. 1, and some of those elements will be described in greater detail in connection with subsequent figures. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Robot 100 includes a sensor system 110 including any of a variety of different types of sensors, depending on the particular kind of robot and application. Such sensors can include, without limitation, cameras, Light Detection and Ranging (LIDAR) sensors, infrared sensors, radar sensors, and sonar sensors. In a vehicular embodiment, sensor system 110 can also include sensors that produce Controller-Area-Network (CAN-bus) data such as position, heading, speed, acceleration, etc., of robot 100 itself. Sensor system 110 outputs various corresponding types of sensor data 135 (e.g., images, LIDAR point clouds, CAN-bus data, etc.).

The sensor data 135 is input to a perception system 115, which performs tasks such as image segmentation and object detection, trajectory prediction, and tracking. These perceptual tasks can apply to robot 100 itself, other objects in the environment (e.g., other road users, in a vehicular embodiment), or both. Perception system 115 outputs an initial state 140, an initial nominal control trajectory 145, and a KL divergence bound 150 for robot 100. Those inputs are processed by a robot control system 120 that executes the RAT iLQR algorithm, an algorithm for solving the bilevel optimization problem mentioned above. Robot control system 120 outputs an updated nominal control trajectory 155, control gains 160, and a risk-sensitivity parameter 165. These outputs are fed to one or more actuators 125 in robot 100, which output forces and torques 170 to control robot 100. These forces and torques 170 impact the movement of robot 100 (robot dynamics) and, in some cases, its interactions with other objects in the environment (dynamics and environment 130, in FIG. 1), which involve motion and forces 175 that are detected via sensor system 110. In some embodiments, robot 100 may be classified as a stochastic nonlinear system.

Figure 2:
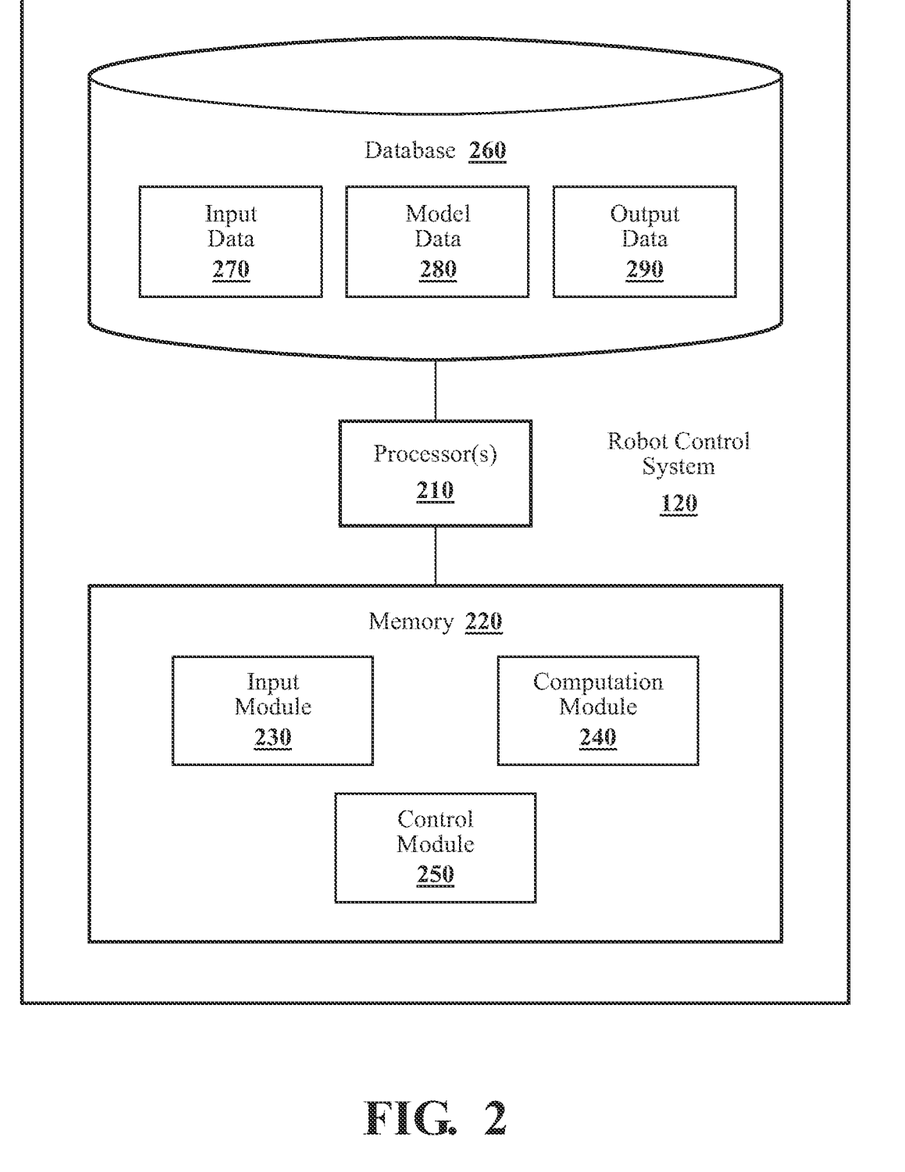
FIG. 2 illustrates one embodiment of a robot control system.

With reference to FIG. 2, one embodiment of the robot control system 120 of FIG. 1 is further illustrated. The robot control system 120 is shown as including one or more processors 210. Robot control system 120 also includes a memory 220 communicably coupled to the one or more processors 210. The memory 220 stores an input module 230, a computation module 240, and a control module 250. The memory 220 is a random-access memory (RAM), read-only memory (ROM), a hard-disk drive, a flash memory, or other suitable memory for storing the modules 230, 240, and 250. The modules 230, 240, and 250 are, for example, computer-readable instructions that when executed by the one or more processors 210, cause the one or more processors 210 to perform the various functions disclosed herein.

In connection with its control functions, robot control system 120 can stores various kinds of data in a database 260. For example, in the embodiment shown in FIG. 2, robot control system 120 stores, in database 260, input data 270, model data 280 (e.g., data associated with solving the bilevel optimization problem such as intermediate calculations, model parameters, probability distributions, etc.), and output data 290 (e.g., updated nominal control trajectory 155, control gains 160, and risk-sensitivity parameter 165).

Input module 230 generally includes instructions that when executed by the one or more processors 210 cause the one or more processors 210 to receive an initial state 140 of the robot 100, an initial nominal control trajectory 145 of the robot 100, and a KL divergence bound 150 between a modeled probability distribution for a stochastic disturbance and an unknown actual probability distribution for the stochastic disturbance. Initial state 140 can include, for example, the position, velocity, and heading/pose of robot 100, as well as object-tracking information concerning the state of objects in the environment near robot 100. In an autonomous-vehicle embodiment, the objects in the environment could include, for example, other road users and obstacles. Other road users include, without limitation, other vehicles, motorcyclists, bicyclists, and pedestrians. As discussed above, the various embodiments described herein perform the bilevel optimization based on the worst-case distribution within a set of possible distributions that also includes the distribution used in the stochastic-system model. Such a set of distributions can be analyzed using a metric such as the KL divergence bound 150. As also mentioned above, the robot control system 120 does not have to know, a priori, what that worst-case distribution is. This is one of the advantages of the various embodiments disclosed herein.

The stochastic disturbance can take on different forms, depending on the particular embodiment. For example, in an embodiment in which robot 100 is an autonomous vehicle, the stochastic disturbance could be slippery road conditions caused by rain, ice, or snow. Another example of a stochastic disturbance is that associated with the motion of an other road user such as another vehicle, a motorcyclist, a bicyclist, or a pedestrian. As discussed further below, in some embodiments the modeled probability distribution for the stochastic disturbance is a Gaussian distribution.

Computation module 240 generally includes instructions that when executed by the one or more processors 210 cause the one or more processors 210 to solve a bilevel optimization problem subject to the modeled probability distribution and the KL divergence bound 150 using an iLEQG algorithm and a cross-entropy process in combination. The iLEQG algorithm outputs, among other things, an updated nominal control trajectory 155, and the cross-entropy process outputs a risk-sensitivity parameter 165. The details of the iLEQG algorithm and the cross-entropy process included in the overall RAT iLQR algorithm, including the underlying mathematical concepts, are presented below.

Control module 250 generally includes instructions that when executed by the one or more processors 210 cause the one or more processors 210 to control the operation of the robot 100 based, at least in part, on the updated nominal control trajectory 155 and the risk-sensitivity parameter 165. In an autonomous-vehicle embodiment, the instructions in the control module 250 to control operation of the robot 100 can also include, for example, instructions to avoid a collision with an other road user (e.g., another vehicle, a motorcyclist, a bicyclist, or a pedestrian). The instructions to control the operation of the robot 100 can include instructions to control the movement (e.g., speed, trajectory) of robot 100. For example, in an autonomous-vehicle embodiment, the instructions can cause the one or more processors 210 to control the steering, acceleration, and braking of the vehicle (robot 100).

This description next turns to a more detailed explanation of the RAT iLQR algorithm employed by robot control system 120 (specifically, computation module 240). Consider the following stochastic nonlinear system: $x_{k+1} = f(x_k, u_k) + g(x_k, u_k) w_k$, where $x_k \in \mathbb{R}^n$ denotes the state, $u_k \in \mathbb{R}^m$ the control, and $w_k \in \mathbb{R}^r$ the noise input to the system at time k. For some finite time horizon N, let $w_{0:N} \triangleq (w_0, \ldots, w_N)$ denote the joint noise vector with probability distribution $p(w_{0:N})$. In this embodiment, this distribution is assumed to be a known Gaussian white noise process; i.e., $w_i$ is independent of $w_j$ for all $i \neq j$, and the stochastic nonlinear system defined above is considered to be the reference system.

Figure 3A:
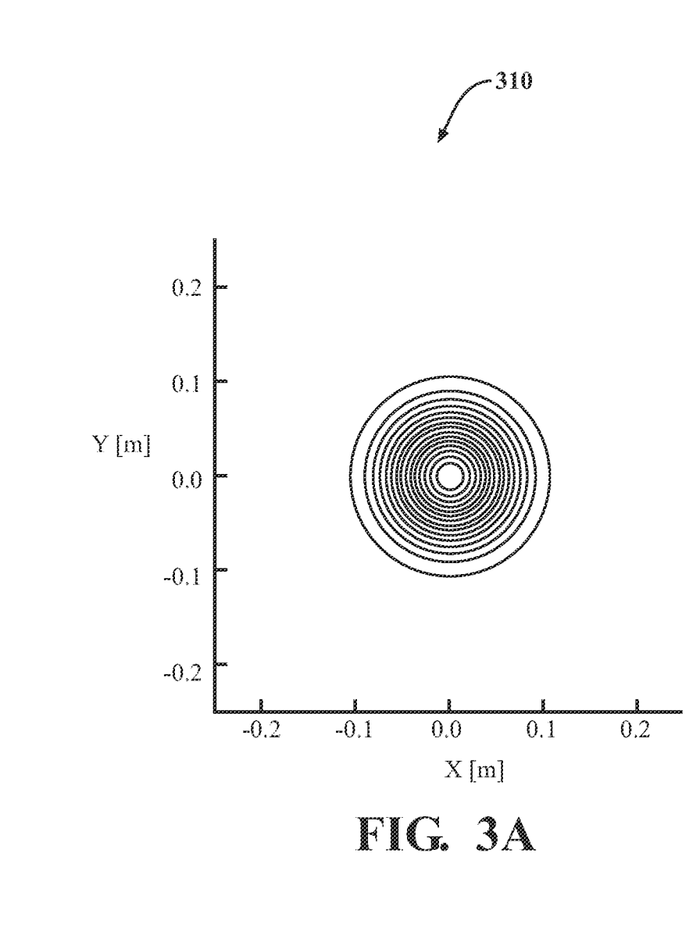
FIG. 3A illustrates a reference probability distribution, in accordance with an illustrative embodiment of the invention.
Figure 3B:
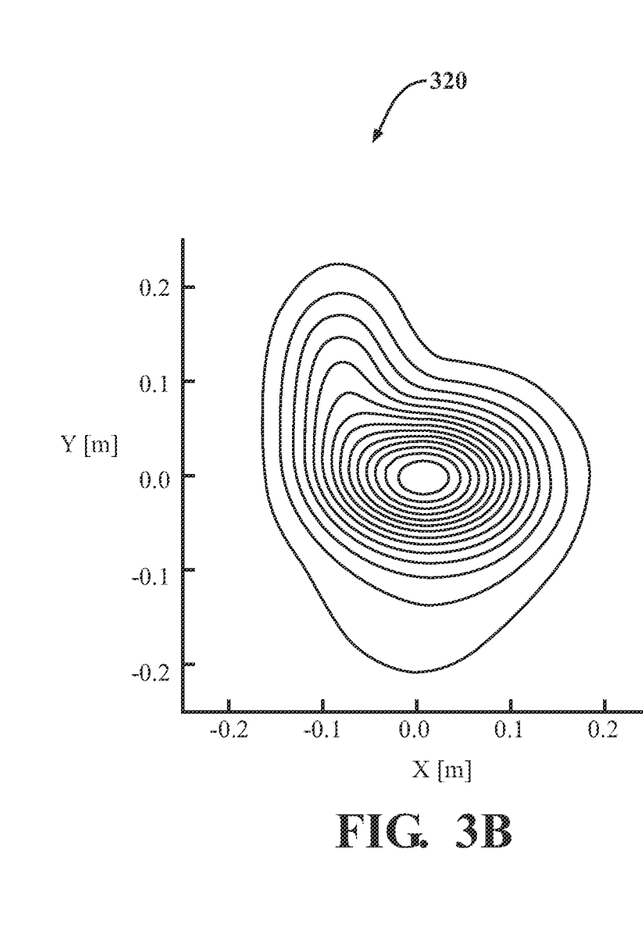
FIG. 3B illustrates an actual probability distribution, in accordance with an illustrative embodiment of the invention.

Ideally, the model distribution p would perfectly characterize the noise in the dynamical system. However, in reality the noise may come from a different, more complex distribution that is not known exactly. This is illustrated in FIGS.

3A and 3B. FIG. 3A depicts a reference distribution 310, and FIG. 3B depicts an actual distribution 320. Let $\overline{w}_{0:N} \triangleq (\overline{w}_0, \ldots, \overline{w}_N)$ denote a perturbed noise vector that is distributed according to $q(\overline{w}_{0:N})$. The perturbed system that characterizes the true but unknown dynamics can be defined as follows: $x_{k+1} = f(x_k, u_k) + g(x_k, u_k)\overline{w}_k$. Note that no assumptions are made that q is Gaussian or that it is white noise. One could also attribute it to potentially unmodeled dynamics. The true, unknown probability distribution q is contained in the set $\mathcal{P}$ of all probability distributions on the support $\mathbb{R}^{r(N+1)}$. The unknown distribution q is assumed not to be "too different" from p. This is expressed as the following constraint (bound) on the KL divergence between q and p: $\mathbb{D}_{KL}(q \| p) \leq d$, where $\mathbb{D}_{KL}(\cdot \| \cdot)$ is the KL divergence, and d>0 is a given constant. Note that $\mathbb{D}_{KL}(q \| p) \geq 0$ always holds, with equality if and only if p=q. The set of all possible probability distributions $q \in \mathcal{P}$ satisfying the above KL divergence constraint is denoted by $\Xi$ which is defined as the ambiguity set. Note that $\Xi$ is a convex subset of $\mathcal{P}$ for a fixed p.

One objective is to control the perturbed system defined above using a state feedback controller of the form $u_k = \mathcal{K}(k, x_k)$. The operator $\mathcal{K}(k, \cdot)$ defines a mapping from $\mathbb{R}^n$ into $\mathbb{R}^m$. The class of all such controllers is denoted $\Lambda$.

The cost model considered in this embodiment is defined as follows: $J(x_{0:N+1}, u_{0:N}) \triangleq h(x_{N+1}) + \Sigma_{k=0}^N c(k, x_k, u_k)$. The foregoing objective is assumed to satisfy the following non-negativity constraints: The functions $h(\cdot)$ and $c(k, \cdot, \cdot)$ satisfy $h(x) \geq 0$ and $c(k, x, u) \geq 0$ for all $k \in \{0, \ldots, N\}$, $x \in \mathbb{R}^n$, and $u \in \mathbb{R}^m$.

Under the above dynamics model for the perturbed system, cost model, and KL divergence constraint on q, an admissible controller $\mathcal{K} \in \Lambda$ is sought that minimizes the worst-case expected value of the cost model. In other words, in this embodiment, computation module 240 solves the following distributionally robust optimal control problem:

$$\inf_{\mathcal{K} \in \Lambda} \sup_{q \in \Xi} \mathbb{E}_q(J(x_{0:N+1}, u_{0:N}))],$$

where $\mathbb{E}_q[\cdot]$ indicates that the expectation is taken with respect to the true, unknown distribution q in the ambiguity set $\Xi$.

Unfortunately, the foregoing distributionally robust optimal control problem is intractable because it involves maximization with respect to the unknown probability distribution q. To overcome this, it can be shown that the foregoing distributionally robust optimal control problem is equivalent to a bilevel optimization problem involving risk-sensitive optimal control with respect to the model distribution p. Before summarizing this equivalence in equation form, the following additional assumption is made: For any admissible controller $\mathcal{K} \in \Lambda$, the resulting closed-loop system satisfies $$\sup_{v \in \mathcal{P}} \mathbb{E}_v[J(x_{0:N+1}, u_{0:N})] = \infty.$$

This assumption means that, without the KL divergence constraint, some adversarially-chosen noise could make the expected cost objective arbitrarily large, in the worst case. This amounts to a controllability-type assumption with respect to the noise input and an observability-type assumption with respect to the cost objective. Under this assumption and the non-negativity assumption discussed above, the following equivalence holds for the distributionally robust optimal control problem defined above:

$$\inf_{\mathcal{K} \in \Lambda} \sup_{q \in \Xi} \mathbb{E}_q(J(x_{0:N+1}, u_{0:N}))] = \inf_{\tau \in \Gamma} \inf_{\mathcal{K} \in \Lambda} \tau \log \mathbb{E}_p\left[\exp\left(\frac{J(x_{0:N+1}, u_{0:N})}{\tau}\right)\right] + \tau d,$$

provided that the set $$\Gamma \triangleq \left\{\tau > 0 : \inf_{\mathcal{K} \in \Lambda} \tau \log \mathbb{E}_p[\exp(J/\tau)] \text{ is finite}\right\}$$

is non-empty. Observe that the first term in the right-hand side of the foregoing equivalence relationship is the entropic risk measure $$R_{p, \frac{1}{\tau}}(J),$$

where the risk is computed with respect to the model distribution p and $\tau > 0$ serves as the inverse of the risk-sensitivity parameter. Rewriting the above equivalence relationship in terms of the risk-sensitivity parameter $$\theta = \frac{1}{\tau} > 0,$$

the right-hand side of the equation is equivalent to $$\inf_{\theta \in \Gamma}\left(\inf_{\mathcal{K} \in \Lambda} R_{p,\theta}(J(x_{0:N+1}, u_{0:N})) + \frac{d}{\theta}\right),$$

where $\Gamma \triangleq \left\{\theta > 0 : \inf_{\mathcal{K} \in \Lambda} R_{p,\theta}(J) \text{ is finite}\right\}$.

Note that the new problem does not involve any optimization with respect to the true distribution q.

The above background leads to formulation of the RAT iLQR algorithm. Even though the mathematical equivalence discussed above is general, it does not immediately lead to a tractable method to efficiently compute a solution for general nonlinear systems. Two remaining challenges need to be addressed. First, exact optimization of the entropic risk with a state feedback control law is intractable, except for linear systems with quadratic costs. Second, the optimal risk-sensitivity parameter needs to be searched efficiently over the feasible space F, which not only is unknown but also varies depending on the initial state $x_0$. The RAT iLQR algorithm overcomes these challenges for general nonlinear systems. An explanation of how the algorithm solves both the inner and outer loop of $$\inf_{\theta \in \Gamma}\left(\inf_{\mathcal{K} \in \Lambda} R_{p,\theta}(J(x_{0:N+1}, u_{0:N})) + \frac{d}{\theta}\right)$$

to develop a distributionally-robust, risk-sensitive MPC follows.

First, consider the inner minimization:

$$\inf_{\mathcal{K} \in \Lambda} R_{p,\theta}(J(x_{0:N+1}, u_{0:N})),$$

where the term $d/\theta$ has been omitted, since it is constant with respect to the controller $\mathcal{K}$. This amounts to solving a risk-sensitive optimal control problem for a nonlinear Gaussian system. In this embodiment, a variant of the discrete-time iLEQG algorithm is employed to obtain a locally optimal solution to the above inner minimization. In what follows, it is assumed that the noise coefficient function $g(x_k, u_k)$ discussed above is the identity mapping, for simplicity. The algorithm begins by applying a given nominal control sequence $l_{0:N}$ to the noiseless dynamics to obtain the corresponding nominal state trajectory $\bar{x}_{0:N+1}$. During each iteration, the algorithm maintains and updates a locally optimal controller $\mathcal{K}$ of the form $\mathcal{K}(k, x_k) = L_k(x_k - \bar{x}_k) + l_k$, where $L_k \in \mathbb{R}^{m \times n}$ denotes the feedback gain matrix. The i-th iteration of the iLEQG implementation includes four steps that are described in detail below.

Step 1 is local approximation. Given the nominal trajectory $\{l_{0:N}^i, \bar{x}_{0:N+1}^i\}$, the following linear approximation of the dynamics, as well as the quadratic approximation of the cost functions, are computed by computation module 240:

$$A_k = D_x f(\bar{x}_k^{(i)}, l_k^{(i)})$$

$$B_k = D_u f(\bar{x}_k^{(i)}, l_k^{(i)})$$

$$q_k = c(k, \bar{x}_k^{(i)}, l_k^{(i)})$$

$$q_k = D_x c(k, \bar{x}_k^{(i)}, l_k^{(i)})$$

$$Q_k = D_{xx} c(k, \bar{x}_k^{(i)}, l_k^{(i)})$$

$$r_k = D_u c(k, \bar{x}_k^{(i)}, l_k^{(i)})$$

$$R_k = D_{uu} c(k, \bar{x}_k^{(i)}, l_k^{(i)})$$

$$P_k = D_{ux} c(k, \bar{x}_k^{(i)}, l_k^{(i)})$$

for $k=0$ to $N$, where $D$ is the differentiation operator. Also, let $q_{N+1} = h(\bar{x}_{N+1}^{(i)})$, $q_{N+1} = D_x h(\bar{x}_{N+1}^{(i)})$, and $Q_{N+1} = D_{xx} h(\bar{x}_{N+1}^{(i)})$.

Step 2 is the backward pass. In this step, computation module 240 performs approximate dynamic programming (DP) using the current feedback gain matrices $L_{0:N}^{(i)}$ as well as the approximate model obtained in Step 1. In this embodiment, it is assumed that the noise vector $w_k$ is Gaussian-distributed according to $\mathcal{N}(0, W_k)$ with $W_k \succ 0$. Also, let $s_{N+1} \triangleq q_{N+1}$, $s_{N+1} \triangleq q_{N+1}$, and $S_{N+1} \triangleq Q_{N+1}$. Given these terminal conditions, computation module 240 recursively computes the following quantities:

$$M_k = W_k^{-1} - \theta S_{k+1}$$

$$g_k = r_k + B_k^T (I + \theta S_{k+1} M_k^{-1}) S_{k+1}$$

$$G_k = P_k + B_k^T (I + \theta S_{k+1} M_k^{-1}) S_{k+1} A_k$$

$$H_k = R_k + B_k^T (I + \theta S_{k+1} M_k^{-1}) S_{k+1} B_k$$

$$s_k = q_k + s_{k+1} - 1/2\theta \log \det(I - \theta W_k S_{k+1}) + \eta/2 s_{k+1}^T M_k^{-1} s_{k+1} + \frac{1}{2} l_k^{(i)T} H_k l_k^{(i)} + l_k^{(i)T} g_k$$

$$s_k = q_k + A_k^T (I + \theta S_{k+1} M_k^{-1}) s_{k+1} + L_k^{(i)T} H_k L_k^{(i)} + L_k^{(i)T} g_k + G_k^T l_k^{(i)}$$

$$S_k = Q_k + A_k^T (I + \theta S_{k+1} M_k^{-1}) S_{k+1} A_k + L_k^{(i)T} H_k L_k^{(i)} + L_k^{(i)T} G_k + G_k^T L_k^{(i)}$$

from $k=N$ down to 0. Note that $M_k \succ 0$ is assumed so that it is invertible, which might not hold if $\theta$ is too large. This is sometimes referred to as "neurotic breakdown," when the optimizer is so pessimistic that the cost-to-go approximation becomes infinity. Otherwise, the approximated cost-to-go for this optimal control (under the controller $\{L_{0:N}^{(i)}, l_{0:N}^{(i)}\}$) is given by $s_0$.

Step 3 is regularization and control computation. Having derived the DP solution, computation module 240 computes new control gains $L_{0:N}^{(i+1)}$ and offset updates $dl_{0:N}$ as follows:

$$L_k^{(i+1)} = -(H_k + \mu I)^{-1} G_k$$

$$dl_k = -(H_k + \mu I)^{-1} g_k,$$

where $\mu \geq 0$ is a regularization parameter to prevent $(H_k + \mu I)$ from having negative eigenvalues. Computation module 240 adaptively changes this regularization parameter $\mu$ across multiple iterations so the algorithm enjoys fast convergence near a local minimum while ensuring the positive-definiteness of $(H_k + \mu I)$ at all times.

Step 4 is a line search for ensuring convergence. It is known that the update could lead to increased cost or even divergence if a new trajectory strays too far from the region where the local approximation is valid. Thus, computation module 240 computes the new nominal control trajectory $L_{0:N}^{(i+1)}$ by backtracking line search with line search parameter $\epsilon$. Initially, $\epsilon = 1$ and computation module 240 derives a new candidate nominal trajectory as follows:

$$\hat{l}_k = L_k^{(i+1)}(\hat{x}_k - \bar{x}_k^{(i)}) + l_k^{(i)} + \epsilon dl_k$$

$$\hat{x}_{k+1} = f(\hat{x}_k, \hat{l}_k).$$

If this candidate trajectory $\{\hat{l}_{0:N}, \hat{x}_{0:N+1}\}$ results in a lower cost-to-go than the current nominal trajectory, then the candidate trajectory is accepted and returned as $\{\hat{l}_{0:N}^{(i+1)}, \hat{x}_{0:N+1}^{(i+1)}\}$. Otherwise, the trajectory is rejected and re-derived with $\epsilon \leftarrow \epsilon/2$ until it is accepted.

The above inner-loop procedure (Steps 1-4) is iterated until the nominal control $l_k$ does not change beyond some threshold in a norm. Once converged, the algorithm returns the updated nominal trajectory $\{l_{0:N}, \bar{x}_{0:N+1}\}$ as well as the feedback gains $L_{0:N}$ and the approximate cost-to-go $s_0$.

Having implemented the iLEQG algorithm for the inner-loop optimization of $$\inf_{\theta \in \Gamma} \left( \inf_{\mathcal{K} \in \Lambda} R_{p,\theta}(J(x_{0:N+1}, u_{0:N})) + \frac{d}{\theta} \right),$$

computation module 240 employs a cross-entropy process to solve the outer-loop optimization for the optimal risk-sensitivity parameter $\theta^*$. This is a one-dimensional optimization problem in which the function evaluation is done by solving the corresponding risk-sensitive optimal control discussed above. In some embodiments, the cross-entropy method is adapted somewhat to derive the approximately optimal value for $\theta^*$. This approach is favorable for online optimization due to the any-time and highly-parallel nature of the Monte Carlo sampling. However, in other embodiments, a different approach can be used. The cross-entropy process is a stochastic method that maintains an explicit probability distribution over the design space. At each step, a set of $m_s$ Monte Carlo samples are drawn from the distribution, from which a subset of $m_e$ "elite samples" that achieve the best performance are selected and retained. The parameters of the distribution are then updated according to the maximum likelihood estimate based on the elite samples. The algorithm terminates after a desired number of steps M.

In one embodiment, computation module 240 models the distribution as univariate Gaussian $\mathcal{N}(\mu, \sigma^2)$. Another issue mentioned above is that the iLEQG algorithm may return a cost-to-go of infinity if a sampled θ is too large due to neurotic breakdown. Since the search space is limited to Γ where θ yields a finite cost-to-go, computation module 240 ensures that each iteration has sufficient samples in Γ.

To address this problem, the cross-entropy process is augmented, in some embodiments, with rejection and re- $m_s$ samples are valid, computation module 240 accepts them but doubles $\mu_{ink}$ and $\sigma_{init}$ because it implies that the initial set of samples is not wide-spread enough to cover the whole feasible set Γ. The parameters $\mu_{ink}$ and $\sigma_{init}$ can be stored internally in the cross-entropy solver of computation module 240 and carried over to the next call to the algorithm.

At runtime, the RAT iLQR algorithm, in some embodiments, is executed as an MPC in a receding-horizon fashion. The control is re-computed after executing the first control input $u_0 = l_0$ and transitioning to a new state. A previously computed control trajectory $l_{0:N}$ can be reused for the initial nominal control trajectory at the next time step to warm-start the computation. The RAT iLQR algorithm ("Algorithm 1") can be summarized by the following pseudocode:

```
Input: Initial state x₀, initial nominal control trajectory l_{0:N}, KL divergence bound d
Output: New nominal trajectory {l_{0:N}, x̄_{0:N+1}}, control gains L_{0:N}, risk-sensitivity
        parameter θ*
1:   Compute initial nominal state trajectory x̄_{0:N+1} using l_{0:N}
2:   i ← 1
3:   while i ≤ M do
4:       while True do
5:           if i = 1 then
6:               θ_{sampled} ← drawSamples(m_s, μ_{init}, σ_{init})
7:           else
8:               θ_{sampled} ← drawSamples(m_s, μ, σ)
9:           end if
10:          array r ▷ Empty array of size m_s
11:          for j ← 1 : m_s do
12:              Solve iLEQG with {l_{0:N}, x̄_{0:N+1}, θ_{sampled}[j]}
13:              Obtain approximate cost-to-go s₀
14:              r[j] ← s₀ + d/θ_{sampled}[j]
15:          end for
16:          m_v ← countValidSamples(θ_{sampled}, r)
17:          if i = 1 and m_v < max(m_e, m_s/2) then
18:              μ_{init} ← μ_{init}/2, σ_{init} ← σ_{init}/2
19:          else if i = 1 and m_v = m_s then
20:              μ_{init} ← 2μ_{init}, σ_{init} ← 2σ_{init}
21:              break
22:          else if m_v ≥ max(m_e, m_s/2) then
23:              break
24:          end if
25:      end while
26:      θ_{elite} ← selectElite(m_e, θ_{sampled}, r)
27:      {μ, σ} ← fitGaussian(θ_{elite})
28:      i ← i + 1
29:  end while
30:  θ* ← μ
31:  Solve iLEQG with {l_{0:N}, x̄_{0:N+1}, θ*}
32:  Obtain new nominal trajectory {l_{0:N}, x̄_{0:N+1}} and control gains L_{0:N}
33:  return l_{0:N}, x̄_{0:N+1}, L_{0:N}, θ*
``` sampling. Out of the $m_s$ samples drawn from the univariate Gaussian distribution, all non-positive samples are first discarded. For each of the remaining samples, computation module 240 evaluates the objective function discussed above by a call to iLEQG and counts the number of samples that obtained a finite cost-to-go. Let $m_v$ be the number of such valid samples. If $m_v \geq \max(m_e, m_s/2)$, computation module 240 proceeds to fit the distribution. Otherwise, computation module 240 repeats the sampling procedure, since there are insufficient valid samples from which to choose the elite samples.

Figure 4:
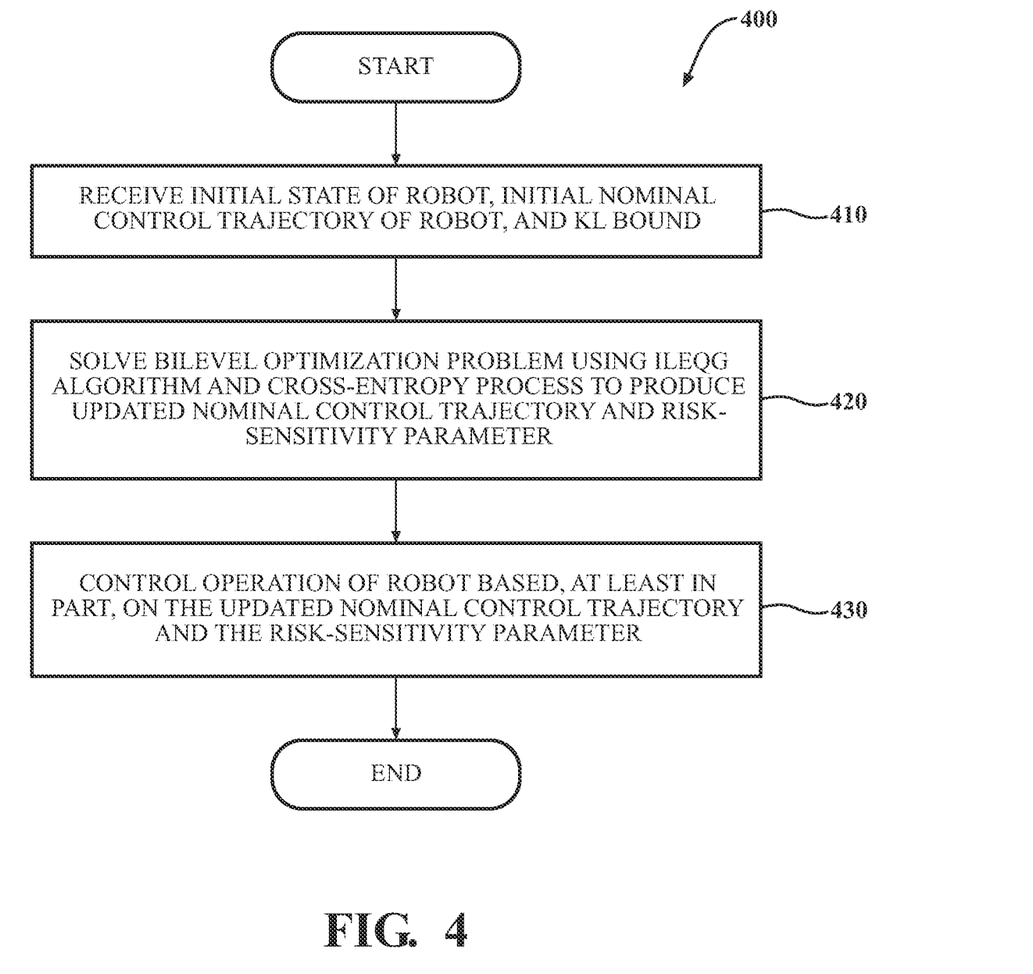
FIG. 4 is a flowchart of a method of controlling a robot, in accordance with an illustrative embodiment of the invention.

In practice, re-sampling is unlikely to occur after the first iteration of the cross-entropy process. However, to avoid the risk that the first iteration might result in re-sampling multiple times, degrading efficiency, computation module 240 also performs an adaptive initialization of the Gaussian parameters $\mu_{init}$ and $G_{init}$ in the first iteration as follows. If the first iteration with $\mathcal{N}(\mu_{init}, \sigma_{init})$ results in re-sampling, computation module 240 not only re-samples but also divides $\mu_{ink}$ and $\sigma_{init}$ by half. On the other hand, if all of the FIG. 4 is a flowchart of a method of controlling a robot, in accordance with an illustrative embodiment of the invention. Method 400 will be discussed from the perspective of robot control system 120 in FIGS. 1 and 2. While method 400 is discussed in combination with robot control system 120, it should be appreciated that method 400 is not limited to being implemented within robot control system 120, but robot control system 120 is instead one example of a system that may implement method 400.

At block 410, input module 230 receives an initial state 140 of the robot 100, an initial nominal control trajectory 145 of the robot 100, and a KL divergence bound 150 between a modeled probability distribution for a stochastic disturbance and an unknown actual probability distribution for the stochastic disturbance. As discussed above, initial state 140 can include, for example, the position, velocity, and heading/pose of robot 100, as well as object-tracking information concerning the state of objects in the environment near robot 100. In an autonomous-vehicle embodiment, the objects in the environment could include, for example, other road users and obstacles. Other road users include, without limitation, other vehicles, motorcyclists, bicyclists, and pedestrians. As also discussed above, the various embodiments described herein perform the bilevel optimization based on the worst-case distribution within a set of possible distributions that also includes the distribution used in the stochastic-system model. Such a set of distributions can be analyzed using a metric such as the KL divergence bound 150.

As discussed above, the stochastic disturbance can take on different forms, depending on the particular embodiment. For example, in an embodiment in which robot 100 is an autonomous vehicle, the stochastic disturbance could be slippery road conditions caused by rain, ice, or snow. Another example of a stochastic disturbance is that associated with the motion of an other road user such as another vehicle, a motorcyclist, a bicyclist, or a pedestrian. As discussed further below, in some embodiments the modeled probability distribution for the stochastic disturbance is a Gaussian distribution.

At block 420, computation module 240 solves a bilevel optimization problem subject to the modeled probability distribution and the KL divergence bound using an iterative Linear-Exponential-Quadratic-Gaussian (iLEQG) algorithm and a cross-entropy process. The iLEQG algorithm outputs an updated nominal control trajectory, and the cross-entropy process outputs a risk-sensitivity parameter. The details of the iLEQG algorithm and the cross-entropy process included in the overall RAT iLQR algorithm (Algorithm 1), including the underlying mathematical concepts, are discussed above.

At block 430, control module 250 controls operation of the robot 100 based, at least in part, on the updated nominal control trajectory and the risk-sensitivity parameter. As discussed above, in an autonomous-vehicle embodiment, the instructions in the control module 250 to control operation of the robot 100 can also include, for example, instructions to avoid a collision with an other road user (e.g., another vehicle, a motorcyclist, a bicyclist, or a pedestrian). The instructions to control the operation of the robot 100 can include instructions to control the movement (e.g., speed, trajectory) of robot 100. For example, in an autonomous-vehicle embodiment, the instructions can control the steering, acceleration, and braking of the vehicle.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for controlling a robot, the system comprising:
   one or more processors; and
   a memory communicably coupled to the one or more processors and storing:
   an input module including instructions that when executed by the one or more processors cause the one or more processors to receive an initial state of the robot, an initial nominal control trajectory of the robot, and a Kullback-Leibler (KL) divergence bound between a modeled probability distribution for a stochastic disturbance and an unknown actual probability distribution for the stochastic disturbance;
   a computation module including instructions that when executed by the one or more processors cause the one or more processors to solve a bilevel optimization problem subject to the modeled probability distribution and the KL divergence bound using an iterative Linear-Exponential-Quadratic-Gaussian (iLEQG) algorithm and a cross-entropy process, the iLEQG algorithm outputting an updated nominal control trajectory, the cross-entropy process outputting a risk-sensitivity parameter; and
   a control module including instructions that when executed by the one or more processors cause the one or more processors to control operation of the robot based, at least in part, on the updated nominal control trajectory and the risk-sensitivity parameter.

2. The system of claim 1, wherein the robot is a stochastic nonlinear system.

3. The system of claim 1, wherein the robot is one of an autonomous vehicle, an autonomous aerial drone, a security robot, a customer-service robot, and a delivery robot.

4. The system of claim 1, wherein the stochastic disturbance is associated with motion of an other road user.

5. The system of claim 4, wherein the other road user is one of a vehicle, a motorcyclist, a bicyclist, and a pedestrian.

6. The system of claim 1, wherein the modeled probability distribution for the stochastic disturbance is a Gaussian distribution.

7. The system of claim 1, wherein the instructions in the control module to control operation of the robot include instructions to avoid a collision with an other road user.

8. A non-transitory computer-readable medium for controlling a robot and storing instructions that when executed by one or more processors cause the one or more processors to:
   receive an initial state of the robot, an initial nominal control trajectory of the robot, and a Kullback-Leibler (KL) divergence bound between a modeled probability distribution for a stochastic disturbance and an unknown actual probability distribution for the stochastic disturbance;
   solve a bilevel optimization problem subject to the modeled probability distribution and the KL divergence bound using an iterative Linear-Exponential-Quadratic-Gaussian (iLEQG) algorithm and a cross-entropy process, the iLEQG algorithm outputting an updated nominal control trajectory, the cross-entropy process outputting a risk-sensitivity parameter; and
   control operation of the robot based, at least in part, on the updated nominal control trajectory and the risk-sensitivity parameter.

9. The non-transitory computer-readable medium of claim 8, wherein the robot is one of an autonomous vehicle, an autonomous aerial drone, a security robot, a customer-service robot, and a delivery robot.

10. The non-transitory computer-readable medium of claim 8, wherein the stochastic disturbance is associated with motion of an other road user.

11. The non-transitory computer-readable medium of claim 10, wherein the other road user is one of a vehicle, a motorcyclist, a bicyclist, and a pedestrian.

12. The non-transitory computer-readable medium of claim 8, wherein the modeled probability distribution for the stochastic disturbance is a Gaussian distribution.

13. The non-transitory computer-readable medium of claim 8, wherein the instructions to control operation of the robot include instructions to avoid a collision with an other road user.

14. A method of controlling a robot, the method comprising:
   receiving an initial state of the robot, an initial nominal control trajectory of the robot, and a Kullback-Leibler (KL) divergence bound between a modeled probability distribution for a stochastic disturbance and an unknown actual probability distribution for the stochastic disturbance;
   solving a bilevel optimization problem subject to the modeled probability distribution and the KL divergence bound using an iterative Linear-Exponential-Quadratic-Gaussian (iLEQG) algorithm and a cross-entropy process, the iLEQG algorithm outputting an updated nominal control trajectory, the cross-entropy process outputting a risk-sensitivity parameter; and controlling operation of the robot based, at least in part, on the updated nominal control trajectory and the risk-sensitivity parameter.

15. The method of claim 14, wherein the robot is a stochastic nonlinear system.

16. The method of claim 14, wherein the robot is one of an autonomous vehicle, an autonomous aerial drone, a security robot, a customer-service robot, and a delivery robot.

17. The method of claim 14, wherein the stochastic disturbance is associated with motion of an other road user.

18. The method of claim 17, wherein the other road user is one of a vehicle, a motorcyclist, a bicyclist, and a pedestrian.

19. The method of claim 14, wherein the modeled probability distribution for the stochastic disturbance is a Gaussian distribution.

20. The method of claim 14, wherein controlling operation of the robot includes avoiding a collision with an other road user.

* * * * *